US009518822B2

(12) United States Patent
Maynard (10) Patent No.: US 9,518,822 B2
(45) Date of Patent: Dec. 13, 2016

(54) SURVEYING AND TARGET TRACKING BY A NETWORK OF SURVEY DEVICES

(71) Applicant: Trimble Navigation Limited, Sunnyvale, CA (US)

(72) Inventor: Kurtis L. Maynard, Gainesville, GA (US)

(73) Assignee: Trimble Navigation Limited, Sunnyvale, CA (US)

( * ) Notice: Subject to any disclaimer, the term of this patent is extended or adjusted under 35 U.S.C. 154(b) by 210 days.

(21) Appl. No.: 14/035,808

(22) Filed: Sep. 24, 2013

(65) Prior Publication Data
US 2015/0085105 A1 Mar. 26, 2015

(51) Int. Cl.
*G01C 15/00* (2006.01)
*H04N 5/232* (2006.01)
*G01C 1/04* (2006.01)

(52) U.S. Cl.
CPC ............ *G01C 15/002* (2013.01); *G01C 1/04* (2013.01); *G01C 15/00* (2013.01); *H04N 5/23238* (2013.01)

(58) Field of Classification Search
CPC .............. A63B 2225/20; A63B 2225/605; A63B 22/20; A63B 24/0087; A63B 69/0028; A63B 69/0053; G01C 15/00; G01C 15/002; G01C 1/04; H04N 5/23238
USPC ................ 348/135, 132, 134, 136
See application file for complete search history.

(56) References Cited

U.S. PATENT DOCUMENTS

| 5,237,384 A * | 8/1993 | Fukunaga | G01C 15/002 299/1.05 |
| 5,477,459 A * | 12/1995 | Clegg | G01S 5/16 356/152.1 |
| 6,127,975 A * | 10/2000 | Maloney | G01S 5/02 342/457 |
| 6,288,676 B1 * | 9/2001 | Maloney | G01S 5/02 342/457 |
| 6,356,646 B1 * | 3/2002 | Spencer | G06K 9/0063 348/144 |

(Continued)

FOREIGN PATENT DOCUMENTS

| CH | EP 1686350 A1 * | 8/2006 | ............. G01C 15/00 |
| EP | 1 573 271 A1 | 9/2005 | |

(Continued)

OTHER PUBLICATIONS

The International Search Report for Application No. PCT/US2014/056996, mailed Jan. 20, 2015, 4 pages.

(Continued)

*Primary Examiner* — Shan Elahi
(74) *Attorney, Agent, or Firm* — Kilpatrick Townsend & Stockton LLP (57) ABSTRACT

A survey device includes a dual-axis position encoder, a video camera coupled, a laser rangefinder, a wireless transceiver, and a processor. The processor is configured to autonomously orient the video camera via the dual-axis position encoder, autonomously identify other survey devices and a target that are within a line-of-sight field-of-view of the video camera, operate the laser rangefinder to determine range to the autonomously identified target and the autonomously identified other survey devices, and determining coordinates of the autonomously identified target and the autonomously identified other survey devices based on the dual-axis position encoder.

20 Claims, 5 Drawing Sheets

(56) References Cited

U.S. PATENT DOCUMENTS

| | | | |
|---|---|---|---|
| 6,741,744 B1* | 5/2004 | Hsu | G06K 9/6253 382/113 |
| 6,748,340 B2 | 6/2004 | Otsuki et al. | |
| 6,998,601 B2 | 2/2006 | Chin et al. | |
| 7,298,328 B2* | 11/2007 | Wang | G01S 5/0252 342/451 |
| 7,660,441 B2* | 2/2010 | Chen | G06K 9/0063 382/113 |
| 7,751,651 B2* | 7/2010 | Oldroyd | G01C 11/00 382/103 |
| 8,208,689 B2* | 6/2012 | Savolainen | G06K 9/0063 382/110 |
| 8,571,800 B2 | 10/2013 | Fortune et al. | |
| 8,596,385 B2* | 12/2013 | Benson | E21B 7/04 175/26 |
| 8,839,526 B2* | 9/2014 | Hinderling | G01C 15/002 33/292 |
| 8,977,033 B1* | 3/2015 | Maurer | G06K 9/6202 348/137 |
| 9,256,932 B1* | 2/2016 | Maurer | G06K 9/6202 |
| 9,354,054 B2* | 5/2016 | Kumagai | G01C 15/004 |
| 2003/0059743 A1* | 3/2003 | Lechner | G09B 9/085 434/43 |
| 2003/0193016 A1* | 10/2003 | Chin | G01D 5/347 250/231.13 |
| 2004/0041999 A1* | 3/2004 | Hogan | G06T 7/0044 356/141.5 |
| 2004/0059536 A1* | 3/2004 | Chang | G01R 31/31935 702/120 |
| 2004/0059539 A1* | 3/2004 | Otsuki | G01C 15/00 702/150 |
| 2004/0233461 A1* | 11/2004 | Armstrong | G01C 11/025 356/620 |
| 2005/0057745 A1* | 3/2005 | Bontje | G01C 15/002 356/139.03 |
| 2005/0090987 A1* | 4/2005 | Amundsen | G01V 1/284 702/14 |
| 2006/0018642 A1* | 1/2006 | Chaplin | G01V 8/10 396/7 |
| 2006/0125692 A1* | 6/2006 | Wang | G01S 5/0252 342/451 |
| 2007/0014488 A1* | 1/2007 | Chen | G06K 9/0063 382/294 |
| 2008/0246355 A1* | 10/2008 | Siegel | H02J 7/1415 310/80 |
| 2010/0109948 A1* | 5/2010 | Razoumov | G01S 19/48 342/357.28 |
| 2011/0185806 A1* | 8/2011 | Pfutzner | G01V 7/06 73/152.54 |
| 2011/0267222 A1* | 11/2011 | Craig | G01S 13/878 342/25 B |
| 2013/0093882 A1* | 4/2013 | Kotzur | G01C 1/04 348/135 |
| 2013/0253822 A1* | 9/2013 | Fortune | G01S 19/43 701/518 |
| 2013/0325520 A1* | 12/2013 | Stewart | G06Q 30/0282 705/4 |
| 2014/0023280 A1* | 1/2014 | Lin | G06F 17/30262 382/218 |

FOREIGN PATENT DOCUMENTS

| | | |
|---|---|---|
| EP | 1686350 A1 | 8/2006 |
| EP | 2405236 A1 | 1/2012 |
| EP | 2405237 A1 | 1/2012 |
| WO | 2004/057269 | 7/2004 |

OTHER PUBLICATIONS

The Written Opinion for Application No. PCT/US2014/056996, mailed Jan. 20, 2015, 9 pages.

* cited by examiner

SURVEYING AND TARGET TRACKING BY A NETWORK OF SURVEY DEVICES

BACKGROUND

Surveying an environment typically requires a team of surveyors. For instance, to determine an angle and/or distance from a first location to a second location, a person stands a transit located on a tripod at the first location, and another person stands at the second location with a measuring rod. The person at the transit looks through the telescope of the transit to locate the measuring rod. The horizontal/vertical angles of transit with respect to the rod at the second location facilitates in the surveying of the environment.

A total station may be used to simplify the surveying of an environment. However, a typical total station often requires manual intervention to properly place the total station on a tripod and also provide user input to control the operation of the total station.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Embodiments of a Survey Device

Figure 1:
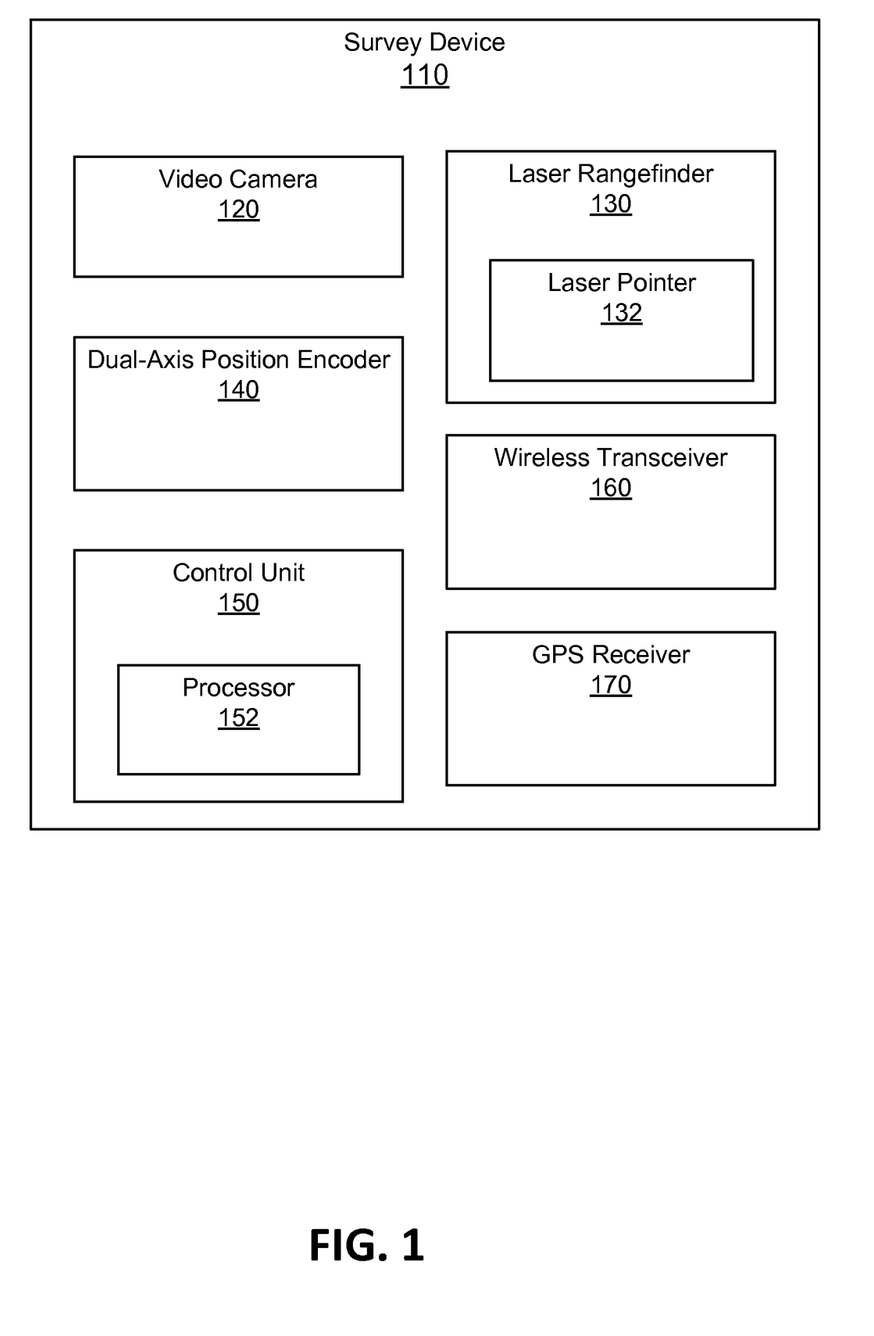
FIG. 1 is a block diagram that illustrates an embodiment of a survey device.

FIG. 1 depicts a block diagram that illustrates an embodiment of survey device 110. Survey device 110 includes, among other things, video camera 120, laser rangefinder 130, dual-axis position encoder 140, control unit 150, wireless transceiver 160, and optionally, global positioning system receiver 170.

In general, survey device 110 is configured to survey an environment that is in the field-of-view of video camera 120, which will be described in further detail below. Additionally, survey device 110 is configured to, among other things, scan the environment, locate other survey devices, track targets, locate obstructions, etc. More specifically, survey device 110 is able to determine coordinates of a located target and/or object.

Survey device 110 can be a robotic total station. In general, robotic total stations are able to scan an environment, locate other survey devices, track targets, locate obstructions, etc. Typically, robotic total stations are configured for coordinate measurements, angle measurements, distance measurements, and processing of the measurements and other survey information.

Video camera 120 can be any video camera that is able to facilitate in surveying an environment.

In one embodiment, video camera 120 is coupled to one or more servos such that video camera 120 is able to rotate about both a horizontal axis (e.g., up and down) and a vertical axis (e.g., side-to-side).

Moreover, video camera 120 is coupled to a position encoder. In one embodiment, video camera is coupled to dual-axis position encoder 140.

Dual-axis position encoder 140 enables the accurate measurement of the azimuth (based on the angle of the video camera rotating about the vertical axis) and the elevation (based on the angle of the video camera rotating about the horizontal axis).

In one embodiment, dual-axis position encoder 140 is a dual-axis encoder servo. As such, the dual-axis encoder servo orients the video camera along a vertical axis and a horizontal axis, and measures, at least the azimuth and elevation of the video camera.

Video camera 120 is configured to be autonomously oriented. For example, video camera 120 is able to autonomously move about a vertical and/or horizontal axis to survey the associated environment that is in the field-of-view and line-of-sight of the video camera. It should be appreciated that any scanning algorithm may be utilized for autonomously orienting the video camera such that the environment is properly surveyed.

The term "autonomously," as used herein, refers to the operation of the survey device without requiring any user input and/or input from a source external to the survey device. For example, once placed in a secure position in an environment, survey device may automatically and autonomously initiate scanning and surveying the environment.

In one embodiment, video camera 120 is autonomously oriented by dual-axis position encoder 140. That is, dual-axis position encoder 140 is a dual-axis encoder servo that orients video camera 120 along a vertical axis and a horizontal axis.

Additionally, video camera 120 is configured to autonomously identify other survey devices, such as survey devices similar to survey device 110. Survey device 110 and one or more other survey devices are disposed in an environment to be surveyed. The survey devices autonomously scan the environment and are able to identify one another, which will be described in further detail below.

Survey devices are able to identify one another (e.g., determine coordinates) based on various methods. For example, one or more survey devices include a target (e.g., cross-hair target). When the target of a first survey device is in the line-of-sight field-of-view of a second survey device, the second survey device is able to identify the first survey device based on the viewed target. More specifically, the second survey device can determine the coordinates of the first survey device based on measured angles by an encoder and the distance to the first survey device measured by a rangefinder (e.g., laser rangefinder 130).

In another example, one or more survey devices have a reflector (e.g., corner cube, retroreflector, or the line). In such an example, a first survey device transmits a light towards a second survey device that includes a reflector, when light reflected from the reflector of the second survey device is in the line-of-sight field-of-view of the first survey device, the first survey device is able to identify the second survey device based on the reflected light.

In one example, a survey device is able to identify another survey target based on video recognition. That is, the video generated by video camera 120 is analyzed to find features similar to the physical features of other survey devices. When a match is determined, then the other survey device is identified.

In a further example, one or more survey devices have a global positioning system (GPS) receiver (170), global navigation satellite system (GNSS) receiver or the like. Accordingly, a first survey device transmits its coordinates (from the GPS receiver) to a second survey device. The second survey device is able to utilize the provided coordinates to facilitate in the ability second device ability to intelligently scan the environment and identify the location of the first survey device by focusing the scanning pattern on an area of the coordinates rather than randomly finding the first survey device during a scan of the entire environment.

Laser rangefinder 130 is configured to determine a range (or distance) between survey device 110 and any target or object within the line-of-sight field-of-view of video camera 120. It should be appreciated that laser rangefinder 130 may be any distance measuring device that is able to measure a distance between a survey device and any other object (e.g., survey device, target, etc.) in the surveyed environment.

In general, laser rangefinder 130 is a device which uses a laser beam to determine the distance to an object. For example, laser rangefinder 130 operates on the time of flight principle by sending a laser pulse in a narrow beam towards the object and measuring the time taken by the pulse to be reflected off the target and returned to the laser rangefinder.

Laser rangefinder 130 is oriented in a similar fashion as video camera 120, as described above. For instance, the laser rangefinder is coupled with video camera 120. Accordingly, the various servos are able to position the laser rangefinder along a vertical axis and a horizontal axis. More specifically, laser rangefinder 130 is also coupled to dual-axis position encoder 140. As such, dual-axis position encoder 140 is able to measure the azimuth and the elevation of the laser rangefinder.

Control unit 150 is configured to control the operation of survey device 110. That is, control unit 150 provides the logic and/or processing to control and operate the various components of survey device 110.

In one embodiment, processor 152 is configured to autonomously orient video camera 120 and laser rangefinder 130. For example, in one embodiment, processor 152 provides the processing functionality such that video camera 120 and laser rangefinder 130 are able to be autonomously oriented in conjunction with one another. That is, video camera 120 and laser rangefinder 130 are coupled to one another such that they are oriented with one another.

Moreover, processor 152 is able to provide the requisite processing functionality to determine the coordinates of various entities in the surveyed environment, such as, but not limited to, survey devices, targets, obstructions, etc.

Wireless transceiver 160 is configured to wirelessly transmit information to a surveying network and receive information from the surveying network. The wireless communication facilitates communication and exchange of information between survey devices 110 in the surveying the environment, which will be described in further detail below.

Embodiments of a Survey System

Figure 2:
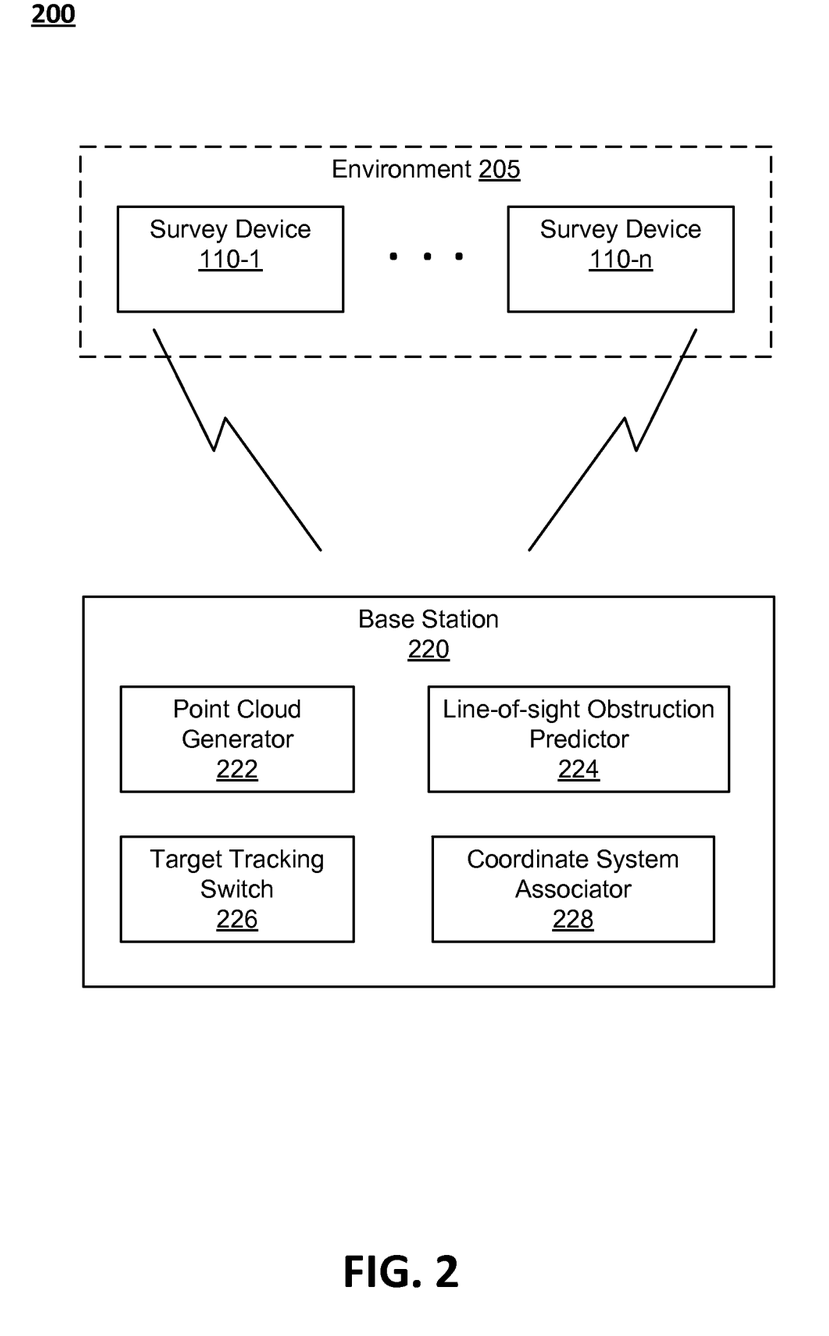
FIG. 2 is a block diagram that illustrates an embodiment of a survey device system.

FIG. 2 depicts a block diagram that illustrates an embodiment of survey system 200. Survey system 200 includes, among other things, survey devices 110-1 to 110-n and base station 220.

Survey devices 110-1 to 110-n are each individually able to wirelessly and bi-directionally communicate with base station 220. As a result, a network is established between the devices/components of survey system 200. A network, as described herein, includes at least two survey devices that are communicatively coupled to a base station.

Survey system 200 includes at least two survey devices to survey environment 205. However, survey system 200 may include any number of survey devices. It is understood that the accuracy of determining coordinates of objects and tracking of a target, among other things, are increased when based on the increase in the number of survey devices utilized to survey environment 205.

Base station 220 is configured to provide various computing functionality for the surveying of environment 205. More specifically, survey devices 110-1 to 110-n wirelessly transmit surveying information to base station 220 to facilitate in the surveying of environment 205 and base station 220 may wireless transmit various surveying information to one or more of survey devices 110-1 to 110-n to facilitate in the surveying of environment 205, which will be described in further detail below.

Base station 220 is any computing system that includes, at least a processor and memory. For example, base station 220 can be, but is not limited to, a personal computer, a laptop, a server, mobile device, etc.

Base station 220 includes, among other things, point cloud generator 222, line-of-sight obstruction predictor 224, target tracking switch 226, and coordinate system associator 228.

Point cloud generator 222 is configured to generate a point cloud of survey environment 205. In general, a point cloud is a set of data points in some coordinate system. In a 3D coordinate system, these points are usually defined by X, Y, and Z coordinates, and may represent the location of an object and/or the external surface of an object.

For example, survey devices 110-1 to 110-n scan environment 205. Environment 205 may be any area that is to be surveyed. Environment 205, can be but is not limited to, outside, inside a building, adjacent a building, a mine, a construction site, etc.

The point cloud includes the coordinates of any object or target within environment 205. As a result, the point cloud is utilized to facilitate in at least tracking of a target within environment 205.

Line-of-sight obstruction predictor 224 is configured to predict the obstruction of the line-of-sight between a survey device and a tracked target. For example, a moving target (e.g., a blade of earth-moving equipment) is tracked by three different survey devices. If moving target moves such that an obstruction obstructs the line-of-sight of a survey device tracking the moving target, then line-of-sight obstruction predictor 224 predicts the obstruction. As a result, the survey device with the obstructed line-of-sight may be temporarily turned off and/or another survey device without an obstructed line-of-sight with the moving target may be turned on, for example, by target tracking switch 226.

Target tracking switch 226 may also turn off a survey device that is no longer needed to survey environment 205 and is subsequently removed from system 200. Likewise, target tracking switch 226 may also turn on a survey device that is newly added to system 200 to track the moving target.

Coordinate system associator 228 is configured to associate a first coordinate system with a second coordinate system. In other words, coordinate system associator 228 associates or maps a first coordinate system, determined by the survey devices, with another coordinate system.

For example, survey devices 110-1 to 110-n determine the coordinates of a target in environment 205 (e.g., a building). The coordinates of the target and another object (e.g., a doorway) of environment 205 are in a first coordinate system (e.g., a local X, Y, Z coordinate system). It may be desired that the first coordinate system be associated or mapped with another coordinate system (e.g., a Building Information Modeling (BIM) coordinate system) that also includes the coordinates of the other object (e.g., a doorway). Accordingly, coordinate system associator 228 maps the first coordinate system with the second coordinate system based at least on part of a common object/coordinates (e.g., doorway) between the two coordinate systems.

It should be appreciated that the survey devices can determine the location of various targets/objects in an environment having various coordinate systems, such as but not limited to, BIM, a local 3D or 2D coordinate system, a global 3D coordinate system, latitude/longitude/elevation, northing and easting, WGS-84, etc. Likewise, coordinate system associator 228 can associate any coordinate system utilized by the survey devices and map the coordinate system with any other coordinate system (e.g., BIM, a local 3D or 2D coordinate system, a global 3D coordinate system, latitude/longitude/elevation, northing and easting, WGS-84, etc.).

Figure 3:
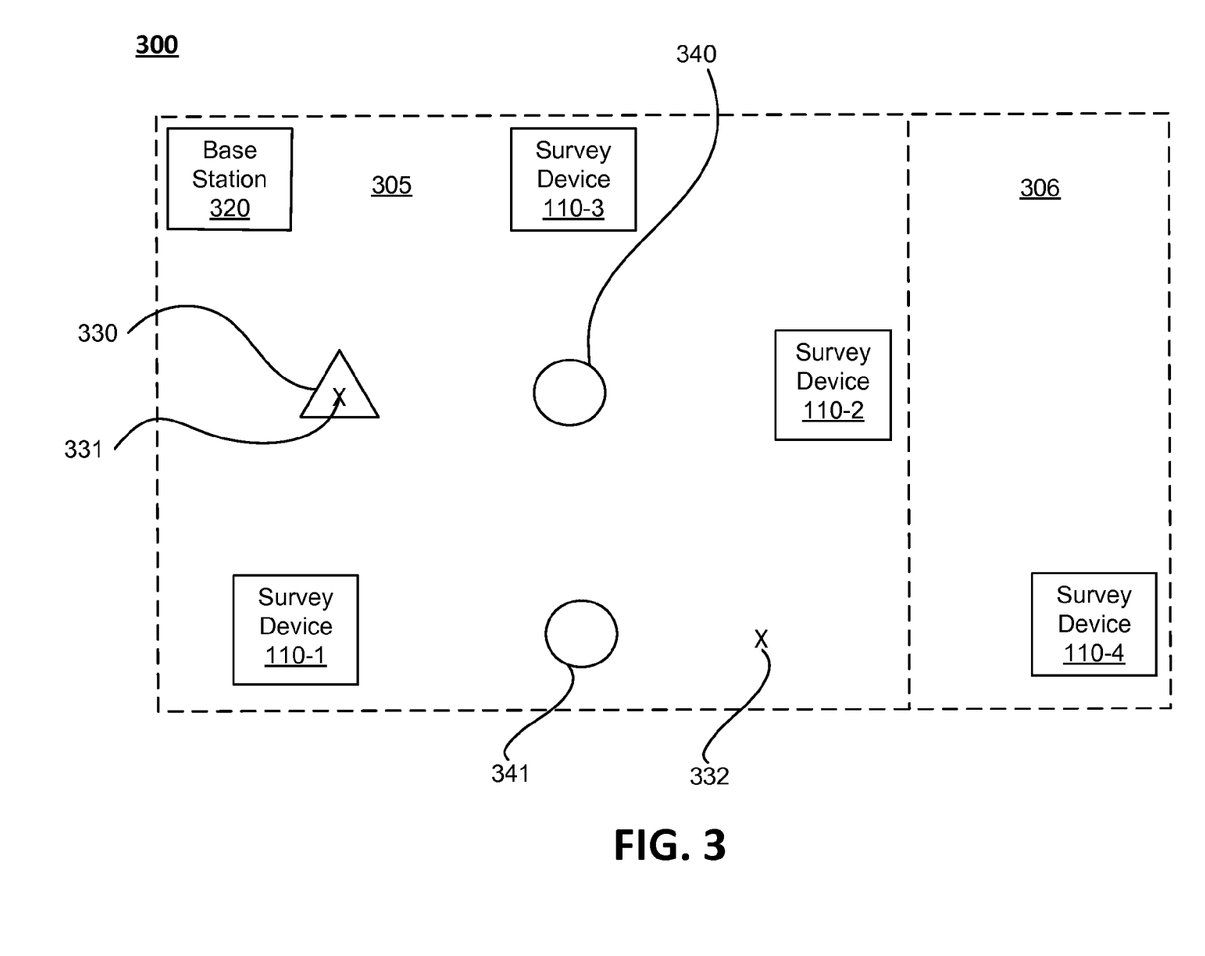
FIG. 3 is a block diagram that illustrates an embodiment of a survey device system.

FIG. 3 depicts a block diagram that illustrates an embodiment of survey system 300. Survey system 300 is similar to survey system 200, as described above. Survey system 300, as depicted in FIG. 3, will describe, in further detail, the functionality and implementation of a survey system surveying an environment.

Survey system 300 includes, survey devices 110-1, 110-2, and 110-3 that are utilized to survey environment 305. Although three separate survey devices are depicted, it should be appreciated that any number of survey devices (i.e., more than two) may be implemented to survey environment 305.

Also, the survey devices may be placed at any location such that they have a substantial field-of-view of environment 305 in order to sufficiently survey the area within environment 305. For example, the survey devices may be placed in a pre-determined pattern or may be placed in an arbitrary location. Additionally, survey devices may be placed at the same elevation or at different arbitrary elevations.

Base station 320 may also be placed at any location such that it is able to wirelessly communicate with the survey devices. Base station 320 may be located inside environment 305 or outside of environment 305.

The survey devices may be set freely on a surface (e.g., ground, ledge, etc.) without requiring to be secured to the surface. In one embodiment, the survey devices are not required to be disposed on a tripod. However, the survey devices may be disposed on a tripod.

The survey devices, in one embodiment, are not required to be level. In such an embodiment, if the devices are disposed on a surface at an angle, the coordinates of surveyed targets/objects are corrected to obviate the angle of the survey device.

Environment 305 can be any physical area that is able to be surveyed. For example, environment 305 may be an ambiguous area without delineated boundaries, such as large construction site. Environment 305 may be a delineated area, such as inside of building, or inside a fenced yard adjacent a house. In another example, environment 305 is the inside of a mine.

Upon the placement of survey devices 110-1, 110-2, and 110-3 at their respective locations, the survey devices autonomously identify one another. For example, survey device 110-1 scans environment 305 and is able to locate and identify survey devices 110-2 and 110-3 when survey devices 110-2 and 110-3 are in the field-of-view line-of-sight of the video camera of survey device. Similarly, survey device 110-2 is able to locate and identify survey devices 110-1 and 110-3 when they are in the field-of-view line-of-sight of the video camera of survey device 110-2. Likewise, survey device 110-3 is able to identify survey devices 110-2 and 110-3, when they are in the field-of-view line-of-sight of the video camera of survey device 110-3.

In conjunction with identifying survey devices, a laser rangefinder (e.g., laser rangefinder 130) disposed in each of the survey devices 110-1, 110-2, and 110-3 facilitates determining the range between each of the survey devices. For example, survey devices 110-1, 110-2, and 110-3 are able to identify one another based on receiving a reflected light from the other survey devices or visually identifying another survey device or a target on another survey device. Following or as part of the identification and/or receipt of reflected light, laser ranging is accomplished using a laser rangefinder.

The angles measured by the dual-axis encoder (e.g., dual-axis position encoder 140) for each survey device, and the distance between the survey devices measured by a laser rangefinder (e.g., laser rangefinder 130) are utilized by a processer to determine the coordinates of each of the survey devices. The coordinates can be determined locally at the survey device and the coordinates may then be transmitted to base station 320 for subsequent use in the wireless network. In one embodiment, the angle/range information may be transmitted to base station 320 and the coordinates are determined, for example, by a processor at base station 320.

It should be appreciated that the coordinates of any surveyed object (e.g., survey device, target, etc.) in environment 305 may be determined, for example, by a processor, based on angles (e.g., azimuth, elevation) of the line-of-sight of the video camera with the object in combination with the range to the object.

Based on the information gathered by survey devices 110-1, 110-2, 110-3, a point cloud is generated for environment 305. For example, survey devices 110-1, 110-2, 110-3 wirelessly transmit location information to a base station, and point cloud generator 222 generates a point cloud for environment 305. The point cloud assists in various surveying functions, such as, but not limited to, tracking a target moving through environment 305.

Target 330 is able to be tracked throughout environment 305. It should be appreciated that target 330 may be tracked by various tracking methods, such as, but not limited to, video recognition, reflector, etc.

In one example, target 330 includes a reflector for reflecting light emitted by a survey device. Specifically, any survey device, having a line-of-sight emits a light (e.g., laser, IR, etc.) at target 330. The emitted light is reflected back to the survey device and the survey device is able to track and continuously determine the coordinates of the moving target.

Target 330 can be any object that is desired to be tracked in environment 305. For example, target 330 is a blade on a piece of machinery used for grading/excavation in environment 305 (e.g., a mine).

In one embodiment, target 330 moves from location 331 to location 332. It is noted that when target 330 is at location 331, survey devices 110-1 and 110-3 have a line-of-sight with target 330. That is, there is not obstruction between target 330 and survey devices 110-1 and 110-3.

While target 330 is at location 331, obstruction 340 is located between target 330 and survey device 110-2. As a result, survey device 110-2 does not have a line-of-sight with target 330 and is unable to track target 330.

Similarly, when target 330 is at location 332, survey devices 110-1 and 110-2 have a line-of-sight with target 330. However, while target 330 is at location 331, obstruction 341 is located between target 330 and survey device 110-1. As a result, survey device 110-2 does not have a line-of-sight with target 330 and is unable to track target 330.

An obstruction is any object that impedes the line-of-sight between a survey device and a target. An obstruction can be, but is not limited to, a rock, a pole, a tree, a ladder, etc. In one embodiment, obstructions are not stationary. For instance, an obstruction is a ladder that is moved from one location to another location.

In one embodiment, it is predicted when a line-of-sight to the target will be obstructed. For example, while target 330 is travelling from location 331 to location 332, line-of-sight obstruction predictor 224, predicts that survey device 110-1 will not have a line-of-sight with target 330, when target reaches location 332. The prediction, in an embodiment, is based, in part, on the generated point cloud that includes the coordinates of the survey devices, obstructions, etc.

Moreover, in response to a prediction that the line-of-sight will be obstructed, the survey device that will have the line-of-sight obstructed is turned off, for example, by target tracking switch 226. For instance, as target 330 moves to location 332, survey device 110-1 is turned off, or is provided instructions not to track target 330, because the line-of-sight of survey device 110-1 to target 330 will be obstructed by obstruction 341.

Conversely, in response to a prediction that the line-of-sight will not be obstructed, the survey device that will have a subsequent line-of-sight is turned on, for example, by target tracking switch 226. For instance, as target 330 moves from location 332 to location 331, survey device 110-1 is turned on, or is provided instructions to once again track target 330, because survey device 110-1 will once again have a line-of-sight to target 330.

Moreover, in various embodiments, survey system 300 is able to concurrently track a plurality of targets (e.g., moving targets). For example, target 330 and another target (not shown) are both moving within environment 305. The survey devices that survey environment 305 are able to track the various moving targets and determine line-of-sight obstructions, etc., for the moving targets. Also, survey system 300 is able to provide a position coordinates for the moving targets based on the tracking of the moving targets by the survey devices.

In one embodiment, survey system 300 may be automatically adjusted in response to a survey device being added to the survey system.

For example, environment 305 is expanded to include environment 306. Additionally, survey device 110-4 is added to survey system 300 to facilitate in surveying newly expanded survey environment. In such an example, once survey device 110-4 is in place and turned on, it scans environments 305 and 306 in the same fashion, as described with respect to survey devices 110-1, 110-2, 110-3. Also, survey device 110-4 communicates with base station 320 and/or other survey devices such that the survey system is aware of the new addition of survey device 110-4 and the information gathered by survey device 110-4. In one embodiment, the point cloud of environment 305 is expanded to include the point cloud of environment 306.

In another embodiment, the size of the surveyed environment is changed or reduced. For example, environment 306 is removed such that the survey environment includes environment 305 but does not include survey environment 306. Accordingly, survey device 110-4 is automatically removed from survey system 300. As a result, survey devices 110-1, 110-2, 110-3 are utilized to survey environment 305 and track target 330.

In various embodiments, a survey device also includes laser pointer (e.g., laser pointer 132). It should be appreciated that the laser rangefinder, in one embodiment, may be a laser pointer. The laser pointer is configured to mark a particular coordinate with a light that is visible to a human, to an electronic device, or to both.

For example, environment 305 is a building having plumbing embedded within the walls. A BIM of the building provides the coordinates of the routing of the plumbing system throughout the building. If a particular plumbing feature is in need of repair or replacement having a particular coordinate, the survey system is able to provide instructions to the laser pointer such that the laser pointer marks the location on a wall where the plumbing feature to be repaired/replaced is located. Accordingly, a plumber knows the particular location of where the repair/replacement is to be accomplished without tearing into the wall and searching for the location. This reduces the time cost of this and similar work involving objects which are mapped in a coordinate system but that are disposed behind a wall, beneath the ground, inside of another object, or the like, such that they are not immediately visible to a human worker.

Example Methods Of Operation

Figure 4A:
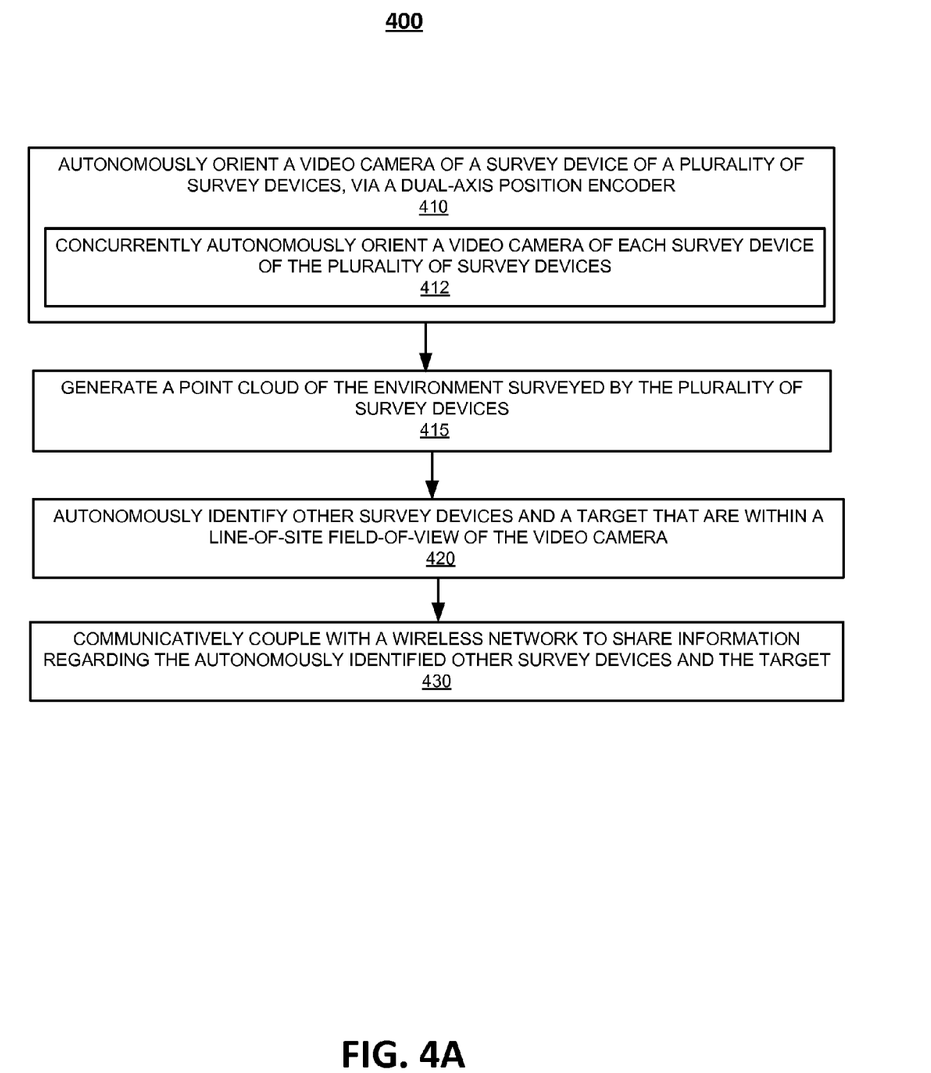
FIGS. 4A and 4B depict a method of surveying an environment and tracking a target according to various embodiments.
Figure 4B:
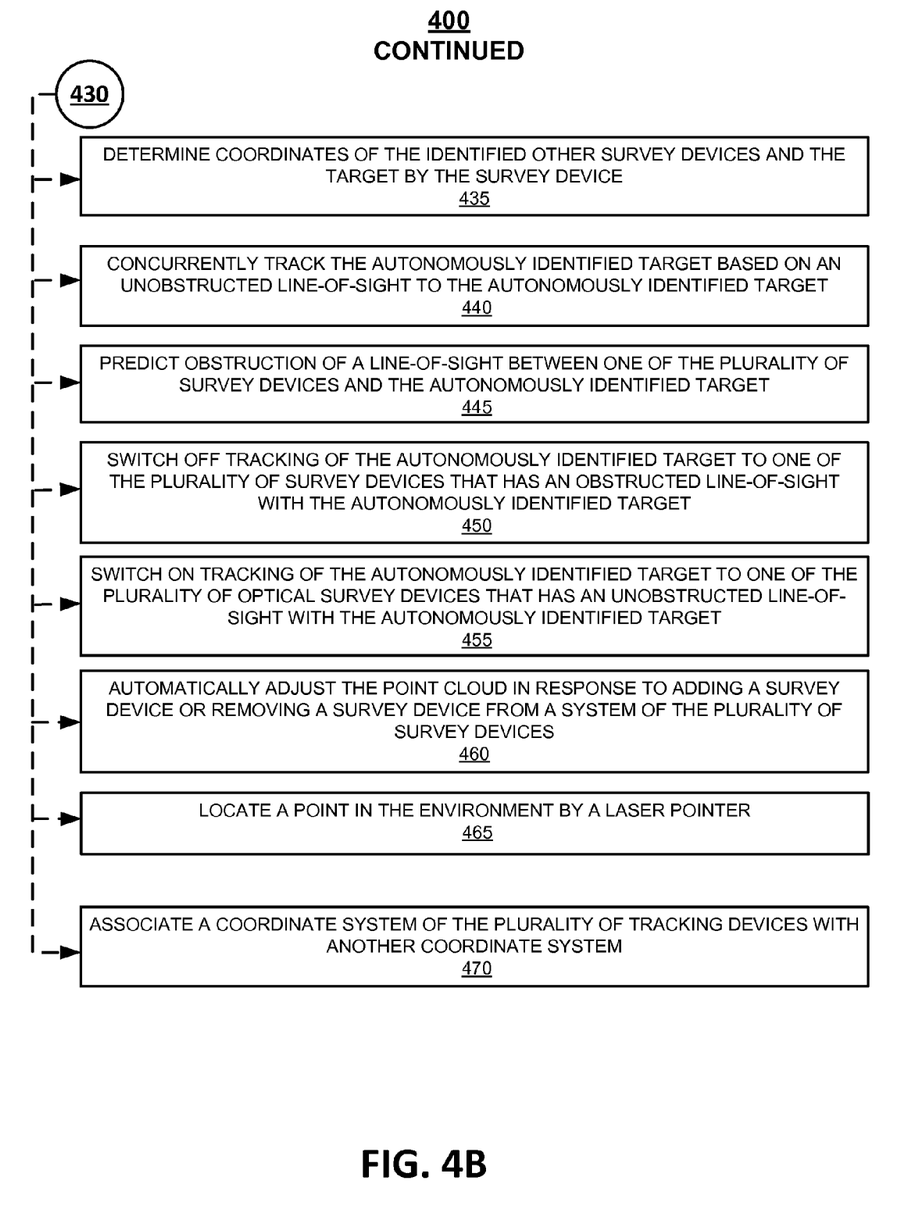

The following discussion sets forth in detail the operation of some example methods of operation of embodiments. With reference to FIGS. 4A and 4B, flow diagram 400 illustrates example procedures used by various embodiments. Flow diagram 400 includes some procedures that, in various embodiments, are carried out by a processor under the control of computer-readable and computer-executable instructions. In this fashion, procedures described herein and in conjunction with flow diagram 400 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with a survey device and/or a base station. The computer-readable and computer-executable instructions, which reside on tangible computer readable storage media, are used to control or operate in conjunction with, for example, one or some combination of processors of the survey device and/or a base station. It is appreciated that the processor(s) may be physical or virtual or some combination (it should also be appreciated that a virtual processor is implemented on physical hardware). Although specific procedures are disclosed in flow diagram 400, such procedures are examples. That is, embodiments are well suited to performing various other procedures or variations of the procedures recited in flow diagrams 400. Likewise, in some embodiments, the procedures in flow diagram 400 may be performed in an order different than presented and/or not all of the procedures described in one or more of these flow diagrams may be performed. It is further appreciated that procedures described in flow diagram 400 may be implemented in hardware, or a combination of hardware with firmware and/or software.

FIGS. 4A and 4B depicts a flow diagram for a method for surveying an environment and tracking a target, according to various embodiments. Reference will be made to features of FIGS. 1-3 in the description of FIGS. 4A and 4B.

With reference to FIG. 4A, at 410 of flow diagram 400, a video camera of a survey device of a plurality of survey devices is autonomously oriented, via a dual-axis position encoder. For example, video camera 120 of survey device 110 is autonomously oriented about a vertical and/or horizontal axis via dual-axis position encoder 140. That is, video camera 120 is able to position itself such that it scans an environment without requiring any input or instructions from a user or other entity outside of survey device 110. In one embodiment, control unit 150 provides instructions to dual-axis position encoder 140 to orient the video camera.

Moreover, dual-axis position encoder 140 is a servo motor that enables the dual-axis positioning. Moreover, the dual-axis position encoder provides an output such that processor 152 (or a processor in base station 220) calculates the position of the video camera (and laser rangefinder).

At 412, in one embodiment, a video camera of each survey device of the plurality of survey devices is concurrently autonomously oriented. For example, survey devices 110-1, 110-2, 110-3 are each concurrently oriented such they are able to scan environment 305 for the survey of environment 305.

At 415, in one embodiment, a point cloud of the environment surveyed by the plurality of survey devices is generated. For example, survey devices 110-1, 110-2, 110-3 scan and survey environment 305. Moreover, the coordinates of other survey devices and targets are determined. As such, point cloud generator 222 receives the survey information and generates a 3-D point cloud of environment 305.

At 420, other survey devices and a target that are within a line-of-sight field-of-view of the video camera are autonomously identified. For example, survey devices 110-2 and 110-3 that are within the line-of-sight of survey device 110-1 are autonomously identified by survey device 110-1. Additionally, target 330 (when at least at location 331) is autonomously identified by survey device 110-1 when in the line-of-sight of survey device 110-1. In one embodiment, position information and/or image information is provided to processor 152 which identifies the other survey devices and/or target.

The identification can be provided by video recognition, reflectors, etc.

At 430, one or more survey devices in a survey environment communicatively couple with a wireless network to share information regarding the autonomously identified other survey devices and the target. For example, survey devices 110-1, 110-2, 110-3 are communicatively coupled with to a wireless network and transmit information regarding the autonomously identified other survey device and the target to the wireless network. More specifically, in one embodiment, base station 320 receives the information and the information is utilized for various functions in the surveying of environment 305, such as, target tracking, point cloud generation, association of various coordinate systems, etc.

With reference to FIG. 4B, at 435, coordinates of the identified other survey devices and the target are determined by the survey device. For example, dual-axis position encoder 140 provides position information of the video camera and laser rangefinder to processor 152. Additionally, laser rangefinder 130 provides the distance information to processor 152. Accordingly, processor 152 utilizes the received information and determines coordinates of the other survey devices and/or target.

At 440, the autonomously identified target is concurrently tracked based on an unobstructed line-of-sight to the autonomously identified target. For example, survey devices 110-1, 110-2, 110-3 concurrently track target 330 when survey devices 110-1, 110-2, 110-3 have a line-of-sight to target 330. It is noted that if a survey device does not have a line-of-sight with the target, the survey is not able to track the target.

At 445, obstruction of a line-of-sight between one of the plurality of survey devices and the autonomously identified target is predicted. For example, when target 330 moves to location 332, there is an obstruction 341 (e.g., a wall) between survey device 110-1 and target 330. Accordingly, line-of-sight obstruction predictor 224 is able to predict the obstruction of the line-of-sight of survey device 110-2 and target 330 prior to target 330 while target 330 is moving to location 332.

At 450, tracking of the autonomously identified target to one of the plurality of survey devices that has an obstructed line-of-sight with the autonomously identified target is switched off. For example, line-of-sight obstruction predictor 224 predicts the obstruction of the line-of-sight of survey device 110-1 and target 330 prior to target 330 while target 330 is moving to location 332. Accordingly, target tracking switch 226 disables the target tracking of survey device 110-1 when target 330 is at location 332 because of the obstruction of the line-of-sight when target 330 is at location 332.

At 455, tracking of the autonomously identified target to one of the plurality of optical survey devices that has an unobstructed line-of-sight with the autonomously identified target is switched on. For example, line-of-sight obstruction predictor 224 predicts that there is no obstruction of the line-of-sight of survey device 110-1 and target 330 while target 330 is moving to location 331. Accordingly, target tracking switch 226 enables the target tracking of survey device 110-1 when target 330 is moves from location 332 to location 331 because there is a line-of-sight to target 330.

At 460, the point cloud is automatically adjusted in response to adding a survey device or removing a survey device from a system of the plurality of survey devices. For instance, in one embodiment, the surveyed environment is expanded to include environment 306. Survey device 110-4 is added to the survey system/network to facilitate in surveying environment 306. The survey information from survey device 110-4 is provided to the network. As a result, in response to the new information from survey device 110-4, point cloud generator 222 generates a new point cloud of the combination of environment 305 and 306.

In another embodiment, environment 306 is removed from the surveyed environment. Survey device 110-4 is then removed from survey system/network because it is no longer needed to survey environment 306. As a result, in response removing survey device 110-4 due to environment 306 no longer desired to surveyed, point cloud generator 222 generates a new point cloud of environment 305.

At 465, a point in the environment is located by a laser pointer. For example, a hole is to be drilled through a wall of environment 305. Coordinates of the plumbing and electrical system of the environment are provide by a BIM. Laser pointer 132 points to locations on the wall where the plumbing and electrical system are not located to provide locations where it is safe to drill through the wall and not interfere with the electrical and/or plumbing systems.

At 470, a coordinate system of the plurality of tracking devices is coordinated with another coordinate system. For example, the coordinates of the survey devices 110-1, 110-2, 110-3 and other features of environment 305 (e.g., a building) are generated in a local x, y, z coordinate system. A BIM of environment 305 x, y, z BIM-related coordinates that do not correspond to the local x, y, z coordinates determined, at least in part, by survey devices 110-1, 110-2, 110-3. As such, coordinate system associator 228, associates or maps the local x, y, z coordinate system with the x, y, z BIM-related coordinate system. Similarly, a surveying backsight or foresight to and/or GPS receiver generated position (e.g., from GPS receiver 170 or an GPS receiver external to a survey device 110) of one or more of the survey devices 110 may be utilized to integrate a coordinate system of the plurality of tracking devices with another coordinate system. For interior survey environments (e.g., inside a building, inside of a mineshaft, or the like) a surveying sight may be shot through a window or opening into the interior survey environment.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

The invention claimed is:

1. A survey device comprising:
a dual-axis position encoder;
a video camera coupled with the dual-axis position encoder;
a laser rangefinder coupled with the dual-axis position encoder;
a processor in data communication with the dual-axis position encoder, the video camera, and the laser rangefinder;
a wireless transceiver in data communication with the processor; and
a non-transitory computer readable storage medium in data communication with the processor, wherein the non-transitory computer readable storage medium includes instructions that, when executed by the processor, causes the processor operations including:
orienting, without input from a user or an external device, the video camera using the dual-axis position encoder to scan a plurality of locations within a line-of-sight and field of view of the video camera;
identifying, without input from the user or the external device, a first additional survey device present within a line-of-sight and field-of-view of the video camera, wherein identifying the first additional survey device includes detecting an optical signal from the first additional survey device;
determining a first location of the first additional survey device, wherein determining the first location includes identifying one or more angles of the dual-axis position encoder corresponding to identification of the first additional survey device;
operating the laser rangefinder to determine a first distance to the first additional survey device;
determining first coordinates of the first additional survey device, wherein determining the first coordinates includes using the first location and the first distance;
wirelessly transmitting, using the wireless transceiver, the first coordinates;
identifying, without input from the user or the external device, a target present with the line-of-sight and field of view of the video camera, wherein identifying the target includes detecting an optical signal from the target;
determining, a second location of the target, wherein determining the second location includes identifying one or more angles of the dual-axis position encoder corresponding to identification of the target;
operating the laser rangefinder to determine a second distance to the target;
determining second coordinates of the target, wherein determining the second coordinates includes using the second location and the second distance; and
wirelessly transmitting, using the wireless transceiver, the second coordinates.

2. The survey device of claim 1, further comprising:
a laser pointer coupled with the dual-axis position encoder, wherein the operations further include:
determining a particular coordinate within the line-of-sight and field of view of the camera; and
orienting the laser pointer using the dual-axis position encoder to mark the particular coordinate.

3. The survey device of claim 1, further comprising:
a global positioning system receiver in data communication with the processor, wherein the operations further include:
obtaining absolute coordinates of the survey device using the global positioning system receiver; and
wirelessly transmitting, using the wireless transceiver, the absolute coordinates in order to facilitate the first additional survey device identifying the survey device.

4. A system comprising:
a plurality of optical survey devices, wherein one or more optical survey devices of the plurality of optical survey devices comprises:
a dual-axis position encoder;
a video camera coupled with the dual-axis position encoder;
a laser rangefinder coupled with the dual-axis position encoder;
a processor in data communication with the dual-axis position encoder, the video camera, and the laser rangefinder;

a wireless transceiver in data communication with the processor; and a non-transitory computer readable storage medium in data communication with the processor, wherein the non-transitory computer readable storage medium includes instructions that, when executed by the processor, causes the processor to perform operations including:

orienting, without input from a user or an external device, the video camera using the dual-axis position encoder to scan a plurality of locations within a line-of-sight and field of view of the video camera;

identifying, without input from the user or the external device, a first additional survey device of the plurality of survey devices present within a line-of-sight field-of-view of the video camera, wherein identifying the first additional survey device includes detecting an optical signal from the first additional survey device;

determining a first location of the first additional survey device, wherein determining the first location includes identifying one or more angles of the dual-axis position encoder corresponding to identification of the first additional survey device;

operating the laser rangefinder to determine a first distance to the first additional survey device;

determining first coordinates of the first additional survey device, wherein determining the first coordinates includes using the first location and the first distance;

wirelessly transmitting, using the wireless transceiver, the first coordinates;

identifying, without input from the user or the external device, a target present with the line-of-sight and field of view of the video camera, wherein identifying the target includes detecting an optical signal from the target;

determining a second location of the target, wherein determining the second location includes identifying one or more angles of the dual-axis position encoder corresponding to identification of the target;

operating the laser rangefinder to determine a second distance to the target;

determining second coordinates of the target, wherein determining the second coordinates includes using the second location and the second distance:

wirelessly transmitting, using the wireless transceiver, the second coordinates;

tracking changes to the second coordinates of the target using the dual-axis encoder, the video camera, and the laser rangefinder, wherein tracking includes identifying an unobstructed line-of-sight to the target;

wirelessly transmitting, using the wireless transceiver, the changes to the second coordinates.

5. The system of claim 4, wherein said each of the plurality of optical survey devices further comprises:
a laser pointer coupled with the dual-axis position encoder; and
a global positioning system receiver in data communication with the processor.

6. The system of claim 4, further comprising:
a base station in wireless communication with one or more of the plurality of optical survey devices, wherein the base station includes:
a base-station processor; and
a base-station non-transitory computer readable storage medium in data communication with the base-station processor, wherein the base-station non-transitory computer readable storage medium includes instructions that, when executed by the base-station processor, cause the base-station processor to perform operations including:
generating a point cloud of an environment in a field-of-view of said each of a plurality of optical survey devices.

7. The system of claim 4, further comprising:
a base station in wireless communication with one or more of the plurality of optical survey devices, wherein the base station includes:
a base-station processor; and
a base-station non-transitory computer readable storage medium in data communication with the base-station processor, wherein the base-station non-transitory computer readable storage medium includes instructions that, when executed by the base-station processor, cause the base-station processor to perform operations including:
predicting when a line-of-sight between one of the plurality of optical survey devices and the target is obstructed.

8. The system of claim 4, further comprising:
a base station in wireless communication with one or more of the plurality of optical survey devices, wherein the base station includes:
a base-station processor; and
a base-station non-transitory computer readable storage medium in data communication with the base-station processor, wherein the base-station non-transitory computer readable storage medium includes instructions that, when executed by the base-station processor, cause the base-station processor to perform operations including:
activating a first optical survey device of the plurality of optical survey devices, wherein the first optical survey device has an unobstructed line-of-sight to the target, wherein activating facilitates tracking the target by the first optical survey device; and
deactivating a second optical survey device of the plurality of optical survey devices, wherein the second optical survey device has an obstructed line-of-sight to the target.

9. The system of claim 4, further comprising:
a base station in wireless communication with one or more of the plurality of optical survey devices, wherein the base station includes:
a base-station processor; and
a base-station non-transitory computer readable storage medium in data communication with the base-station processor, wherein the base-station non-transitory computer readable storage medium includes instructions that, when executed by the base-station processor, cause the base-station processor to perform operations including:
associating a coordinate system of the plurality of optical survey devices with another coordinate system.

10. A computer-implemented method for surveying an environment and tracking a target, the method comprising:

orienting, without input from a user or an external device, a video camera of a survey device of a plurality of survey devices, using a dual-axis position encoder;

identifying, without input from the user or the external device, a first additional survey device of the plurality of survey devices present within a line-of-sight and field-of-view of the video camera, wherein identifying the first additional survey device includes detecting an optical signal from the first additional survey device;

determining a first location of the first additional survey device, wherein determining the first location includes identifying one or more angles of the dual-axis position encoder corresponding to identification of the first additional survey device;

operating a laser rangefinder of the survey device to determine a first distance to the first additional survey device;

determining first coordinates of the first additional survey device, wherein determining the first coordinates includes using the first location and the first distance;

identifying, without input from the user or the external device, a target present with the line-of-sight and field of view of the video camera, wherein identifying the target includes detecting an optical signal from the target; and communicatively coupling with a wireless network and wirelessly transmitting the first coordinates to a remote device.

11. The computer-implemented method of claim 10, wherein orienting the video camera comprises:

concurrently orienting, without input from the user or the external device, video cameras of each survey device of the plurality of survey devices.

12. The computer-implemented method of claim 10, further comprising:

determining a second location of the target, wherein determining the second location includes identifying one or more angles of the dual-axis position encoder corresponding to identification of the target; and operating the laser rangefinder to determine a second distance to the target;

determining second coordinates of the target, wherein determining the second coordinates includes using the second location and the second distance; and wherein wirelessly transmitting includes wireless transmitting the second coordinates to the remote device.

13. The computer-implemented method of claim 10, further comprising:

concurrently tracking, by the plurality of survey devices, the target based on unobstructed lines-of-sight between the target and the plurality of survey devices.

14. The computer-implemented method of claim 10, further comprising:

predicting obstruction of a line-of-sight between one of the plurality of survey devices and the target.

15. The computer-implemented method of claim 10, further comprising:

determining that a particular survey device of the plurality of survey devices has an obstructed line-of-sight to the target; and switching off tracking of the target by the particular survey device.

16. The computer-implemented method of claim 15, further comprising:

determining that a particular survey device of the plurality of survey devices has an unobstructed line-of-sight to the target; and switching on tracking of the target by the particular survey device.

17. The computer-implemented method of claim 10, further comprising:

generating a point cloud of said environment surveyed by said plurality of survey devices.

18. The computer-implemented method of claim 17, further comprising:

automatically adjusting said point cloud in response to adding a survey device or removing a survey device from a system of said plurality of survey devices.

19. The computer-implemented method of claim 10, further comprising:

determining a particular coordinate within the environment; and orienting a laser pointer of the survey device to mark the particular coordinate.

20. The computer-implemented method of claim 10, further comprising:

associating a coordinate system of the plurality of survey devices with another coordinate system.

* * * * *